United States Patent
Arya

(10) Patent No.: US 12,350,997 B2
(45) Date of Patent: Jul. 8, 2025

(54) HEAT TRANSFER FLUID SYSTEM FOR A VEHICLE

(71) Applicant: Volvo Truck Corporation, Gothenburg (SE)

(72) Inventor: Pranav Arya, Lindome (SE)

(73) Assignee: Volvo Truck Corporation, Gothenburg (SE)

( * ) Notice: Subject to any disclaimer, the term of this patent is extended or adjusted under 35 U.S.C. 154(b) by 316 days.

(21) Appl. No.: 17/954,570

(22) Filed: Sep. 28, 2022

(65) Prior Publication Data

US 2023/0104057 A1    Apr. 6, 2023

(30) Foreign Application Priority Data

Oct. 5, 2021  (EP) ..................................... 21200847

(51) Int. Cl.
*F28D 20/00* (2006.01)
*B60H 1/00* (2006.01)

(52) U.S. Cl.
CPC ......... *B60H 1/005* (2013.01); *B60H 1/00278* (2013.01); *B60H 2001/00307* (2013.01); *F28D 20/0034* (2013.01); *F28D 20/0039* (2013.01); *F28D 2020/0095* (2013.01)

(58) Field of Classification Search
CPC ................ B60H 1/005; B60H 1/00278; B60H 2001/00307; F24F 12/006; F28D 2020/0095; F28D 20/0039
See application file for complete search history.

(56) References Cited

U.S. PATENT DOCUMENTS

| | | | |
|---|---|---|---|
| 5,898,818 A | 4/1999 | Chen | |
| 10,809,014 B1 | 10/2020 | Harpole | |
| 2011/0296855 A1* | 12/2011 | Johnston | B60L 50/40 62/160 |
| 2013/0240175 A1* | 9/2013 | Tschismar | B60H 1/00278 165/43 |

(Continued)

FOREIGN PATENT DOCUMENTS

| | | |
|---|---|---|
| DE | 29808324 U1 | 9/1998 |
| DE | 102007047435 A1 | 4/2009 |

OTHER PUBLICATIONS

Extended European Search Report for European Patent Application No. 21200847.8, mailed Apr. 5, 2022, 5 pages.

*Primary Examiner* — Paul Alvare
(74) *Attorney, Agent, or Firm* — Withrow & Terranova, PLLC

(57) ABSTRACT

A heat transfer fluid system for a vehicle including an electric energy supply system such as a fuel cell system and/or a battery system, the heat transfer fluid system including a heat transfer fluid circuit arranged for controlling the temperature of the electric energy supply system via a heat transfer fluid, and a heat transfer fluid storage tank defining a tank volume for the heat transfer fluid, the heat transfer fluid storage tank including a partition dividing the tank volume into a first volume and a second volume, and a biasing device, wherein the partition is movable to/from any position between a minimum heat storage position corresponding to a minimum second volume, and a maximum heat storage position corresponding to a maximum second volume, and the heat transfer fluid system further including a valve assembly including one or more valves.

17 Claims, 7 Drawing Sheets

(56) References Cited

U.S. PATENT DOCUMENTS

| | | | | |
|---|---|---|---|---|
| 2014/0260376 | A1* | 9/2014 | Kopko | F25D 3/005 |
| | | | | 62/99 |
| 2015/0000331 | A1* | 1/2015 | Jojima | B60H 1/00278 |
| | | | | 62/498 |
| 2015/0013363 | A1* | 1/2015 | Arai | F25B 49/027 |
| | | | | 62/509 |
| 2015/0020536 | A1* | 1/2015 | Lee | F25B 45/00 |
| | | | | 62/324.4 |
| 2015/0266358 | A1* | 9/2015 | Rebinger | B60H 1/3219 |
| | | | | 62/174 |
| 2016/0325722 | A1* | 11/2016 | Sannelius | B60T 10/02 |
| 2016/0370044 | A1* | 12/2016 | Danov | F25B 45/00 |
| 2017/0045278 | A1* | 2/2017 | Uselton | F25B 49/02 |
| 2017/0234626 | A1* | 8/2017 | Schierack | F28D 20/0039 |
| | | | | 165/104.31 |
| 2018/0178615 | A1* | 6/2018 | Xia | H01M 10/486 |
| 2019/0212071 | A1* | 7/2019 | Burk | F28D 20/0034 |
| 2021/0370747 | A1* | 12/2021 | Lee | F25B 41/24 |
| 2021/0402844 | A1* | 12/2021 | Kim | B60H 1/00278 |
| 2022/0082296 | A1* | 3/2022 | Satyanarayana | F24H 15/33 |
| 2023/0364980 | A1* | 11/2023 | Kawaguchi | B60H 1/3227 |

* cited by examiner

HEAT TRANSFER FLUID SYSTEM FOR A VEHICLE

RELATED APPLICATIONS

The present application claims priority to European Patent Application No. 21200847.8, filed on Oct. 5, 2021, and entitled "HEAT TRANSFER FLUID SYSTEM FOR A VEHICLE," which is incorporated herein by reference in its entirety.

TECHNICAL FIELD

The present disclosure relates to a heat transfer fluid system for a vehicle comprising an electric energy supply system. The disclosure further relates to a method for controlling a heat transfer fluid system for heating an electric energy supply system, and to a vehicle.

BACKGROUND

In a vehicle, for example a heavy vehicle such as a truck or bus, different operation conditions may pose a challenge for the operation of energy supply system of the vehicle. One such example is when a vehicle is to be started after a stand-still, when the energy supply system of the vehicle has cooled down from a nominal operation temperature. This problem is particularly pronounced during cold weather conditions. A possible solution for a vehicle comprising a combustion engine, is to burn fuel to initially raise the temperature of the energy supply system. However, this possibility is not available for vehicles lacking a combustion engine. Moreover, electric energy supply systems such as fuel cell systems generally require heating to a nominal temperature before they can be started.

One existing way of heating an electric energy supply system at cold start is by using a heat transfer system such as e.g. a cooling system. The heat transfer fluid in the heat transfer system may be heated using an electric heater and then circulated in the heat transfer system to heat the electric energy supply system. However, for the heating of the heat transfer fluid, this solution requires either connection to a grid or energy to be taken from batteries. This may be challenging since batteries generally do not operate well under cold conditions. Moreover, the resulting load to the batteries may result in faster ageing of the batteries.

Hence, there is a need for improvement and/or alternatives for heating an electric energy supply system in a vehicle, in particular to enable cold start thereof.

SUMMARY

An object of the invention is to provide an alternative and/or an improvement relating to the heating of an electric energy supply system in a vehicle.

The object is achieved by a heat transfer fluid system for a vehicle according to claim 1.

Thus, there is provided a heat transfer fluid system for a vehicle comprising an electric energy supply system such as a fuel cell system and/or a battery system, the heat transfer fluid system comprising a heat transfer fluid circuit arranged for controlling the temperature of the electric energy supply system by means of a heat transfer fluid.

The heat transfer fluid system further comprises a heat transfer fluid storage tank defining a tank volume for the heat transfer fluid, the heat transfer fluid storage tank comprising a partition dividing the tank volume into a first volume and a second volume, and a biasing device, wherein the partition is movable to/from any position between a minimum heat storage position corresponding to a minimum second volume, and a maximum heat storage position corresponding to a maximum second volume, wherein movement of the partition away from the minimum heat storage position corresponds to storing energy in the biasing device, and movement towards the minimum heat storage position corresponds to releasing energy from the biasing device.

Also, the heat transfer fluid system comprises a valve assembly comprising one or more valves being controllable to provide an electric energy supply system heating state of the heat transfer fluid system wherein release of energy from the biasing device implies a flow of heat transfer fluid from the second volume to the first volume via the heat transfer fluid circuit for heating the electric energy supply system.

That the maximum heat storage position corresponds to a maximum second volume implies that the heat transfer system is adapted such that the heat transfer fluid in the second volume will have a temperature higher than the heat transfer fluid in the first volume. I.e., the second volume will form a hot heat transfer fluid buffer, and the first volume will from cold heat transfer fluid buffer.

As such, the heat transfer fluid system provides a manner of heating the electric energy supply system by utilizing energy stored in mechanical form in the biasing device of the tank, and in thermal form stored in the relatively hot heat transfer fluid stored in the second volume of the tank.

Optionally, the heat transfer fluid system further comprises a fluid control assembly comprising one or more fluid control devices for controlling the flow and/or pressure of the heat transfer fluid.

Optionally, the valve assembly is controllable to provide an electric energy supply system cooling state of the heat transfer fluid system wherein a pressure provided by the fluid control assembly implies a flow of heat transfer fluid from the first volume to the second volume via the heat transfer fluid circuit for cooling the electric energy supply system while storing energy in the biasing device.

Thus, the heat transfer fluid system may be arranged to be useful not only for heating the electric energy supply system, but also for, when required, cooling the electric energy supply system.

Thus, optionally, the heat transfer fluid circuit may be configured to allow a flow of heat transfer fluid in two different directions: a first direction configured for heating of the electric energy supply system, and a second direction configured for cooling the electric energy supply system.

The fluid control assembly may be adapted for overcoming the bias from the biasing device so as to enable storing energy in the biasing device.

Optionally, one or more of the fluid control devices of the fluid control assembly comprises a pump.

Optionally, at least one fluid control device is arranged downstream the heat transfer fluid circuit, when the heat transfer fluid system is in the electric energy supply system cooling state.

Optionally, one or more of the fluid control devices of the fluid control assembly comprises an actuator arranged to urge the partition in a direction towards the maximum heat storage position while storing energy in the biasing device.

Optionally, the heat transfer fluid system comprises a fluid control assembly and the heat transfer fluid system further comprises a heat transfer fluid reservoir arranged along a flow path of the heat transfer fluid when the heat transfer fluid system is in the electric energy supply system cooling state.

Optionally, the heat transfer fluid reservoir is arranged downstream the heat transfer fluid circuit, when the heat transfer fluid system is in the electric energy supply system cooling state.

Optionally, the heat transfer fluid system further comprises a fluid cooling circuit comprising a cooling assembly and the valve assembly is controllable to provide a fluid cooling state of the heat transfer fluid system, wherein release of energy from the biasing device implies a flow of heat transfer fluid from the second volume to the first volume via the fluid cooling circuit for cooling the heat transfer fluid.

Thus, by means of the fluid cooling circuit, the heat transfer fluid may be cooled without heating the electric energy supply system as described in the above, so as to provide cool heat transfer fluid for use e.g. for cooling the electrical energy supply system.

The cooling assembly may comprise one or more cooling elements. For example, the cooling assembly may comprise a cooling circuit, comprising one or more cooling elements.

Optionally, the cooling assembly comprises an evaporator and/or a compressor, and/or a condenser and/or an expansion valve.

Optionally, the cooling assembly is configured to be driven by recuperated energy from an energy dissipating arrangement.

Optionally, the heat transfer fluid system comprises one or more sensors, such as temperature sensors and/or pressure sensors.

Optionally, the heat transfer fluid system comprises a temperature sensor providing a signal indicative of a temperature of the heat transfer fluid entering the electric energy supply system.

Optionally, the heat transfer fluid system comprises a control unit adapted to control the valve assembly and/or the fluid control assembly and/or the cooling assembly.

In a second aspect, the object is met by a vehicle according to claim 13. Thus, there is provided a vehicle comprising a heat transfer fluid system according to any one of the preceding claims.

In a third aspect, the object is met by a method according to claim 14. Thus, there is provided a method for controlling a heat transfer fluid system for a vehicle in accordance with the first aspect comprising:
  after determining a need for heating the electric energy supply system,
    using the heat transfer fluid system in the electric energy supply system heating state for heating the electric energy supply system.
  Optionally, the need for heating the electric energy supply system is implied by a cold start situation of the vehicle.
  Optionally, the method comprises:
  after determining a need for cooling the electric energy supply system,
    using the heat transfer fluid system in the electric energy supply system cooling state for cooling the electric energy supply system.
  Optionally, the method comprises:
  after determining a need for cooling the heat transfer fluid, and/or
  after determining a need for dissipating energy,
    using the heat transfer fluid system in the fluid cooling state.

Optionally, the method comprises: after determining a need for heating a heat transfer fluid, using the heat transfer fluid system in the electric energy supply system cooling state and/or using the heat transfer fluid system in the fluid heating state.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.
In the Drawings.

DETAILED DESCRIPTION

Figure 1:
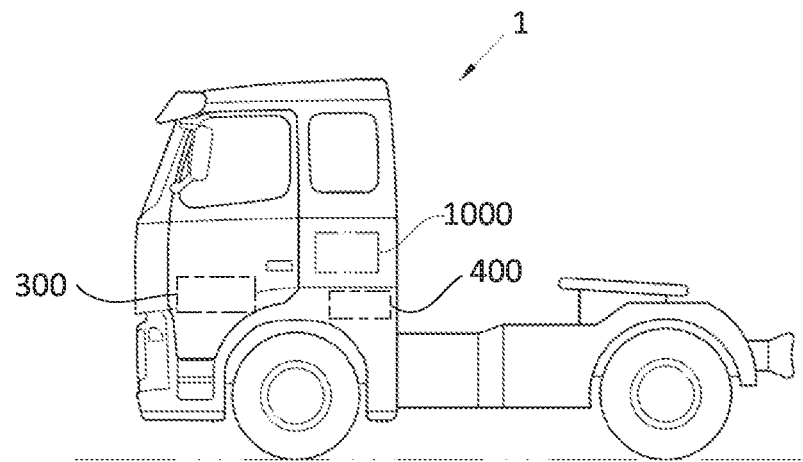
FIG. 1 is a schematical image of an example of a vehicle according to the second aspect for which the other aspects may be implemented.

FIG. 1 illustrates a variant of a vehicle 1 as disclosed herein for which the invention as disclosed herein may be implemented. The invention can be applied in any vehicle, such as in a boat or car. For example, the invention can be applied in heavy-duty vehicles, such as trucks, buses and construction equipment. Although the invention will be described herein with respect to a truck, the invention is not restricted to this particular vehicle, but may also be used in other vehicles such as passenger cars, working machines or buses.

The vehicle 1 comprises an electric energy supply system such as a battery and/or a fuel cell system. In addition, the vehicle 1 may comprise an additional energy supply system, such as a combustion engine. Purely by example, in the illustrated vehicle 1, the electric energy supply system is a fuel cell system 300.

The vehicle 1 further comprises a heat transfer fluid system 1000 arranged for heating the fuel cell system 300, as will be described in the below. Also the vehicle may comprise other arrangements suitable for the vehicle 1. In particular, the vehicle 1 may comprise arrangements which from time to time require energy to be dissipated when the arrangements are in use. For example, the vehicle 1 may comprise a braking arrangement 400, requiring intermittent dissipation of braking energy.

Figure 2:
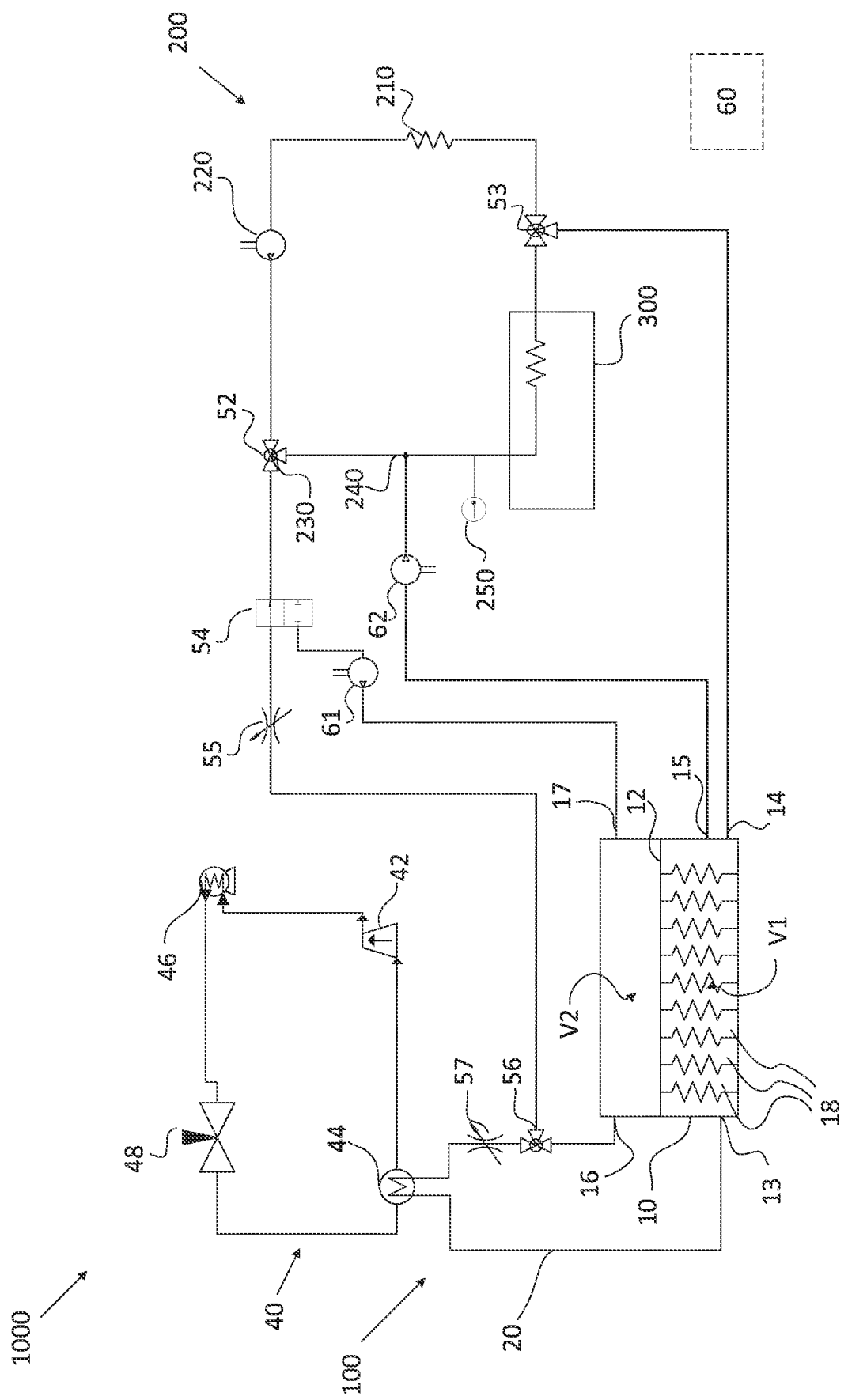
FIG. 2 schematically illustrates a variant of a heat transfer fluid system according to the first aspect.

FIG. 2 schematically illustrates a first variant of a heat transfer fluid system 1000 for a vehicle according to the first aspect. The heat transfer system 1000 comprises an electric energy supply system 300 such as a fuel cell system and/or a battery system.

Further, the heat transfer fluid system 1000 comprises a heat transfer fluid circuit 200 arranged for controlling the temperature of the electric energy supply system 300 by means of a heat transfer fluid.

The heat transfer fluid system 1000 further comprises a heat transfer fluid storage tank 10 defining a tank volume for the heat transfer fluid, the heat transfer fluid storage tank 10 comprising a partition 12 dividing the tank volume into a first volume V1 and a second volume V2, and a biasing device 18, wherein the partition 12 is movable to/from any position between a minimum heat storage position corresponding to a minimum second volume V2, and a maximum heat storage position corresponding to a maximum second volume V2, wherein movement of the partition 12 away from the minimum heat storage position corresponds to storing energy in the biasing device 18, and movement towards the minimum heat storage position corresponds to releasing energy from the biasing device 18.

As will be further explained in the below, the energy storage tank 10 will be arranged such that the heat transfer fluid in the first volume V1 had a relatively lower temperature, and the heat transfer fluid in the second volume V2 has a relatively higher temperature. Accordingly, the maximum energy storage position corresponding to a maximum second volume V2 is also a maximum heat storage position. Similarly, the minimum energy storage position corresponding to a minimum second volume V2 is also a minimum heat storage position.

The tank 10 as such, and the first and second volumes V1, V2 are suitably isolated so as to enable the heat transfer fluid in said first and second volumes V1, V2, respectively, to be maintained at a relatively constant temperature over substantial periods of time.

The energy storage tank 10 further comprises a biasing device 18 being arranged such that movement of the partition 12 away from the minimum energy storage position corresponds to storing energy in the biasing device 18, and movement towards the minimum energy storage position corresponds to releasing energy from the biasing device 18.

For example, the biasing device 18 may comprise one or more spring elements arranged so as to bias the partition 12 towards the minimum energy storage position. Hence, the spring element(s) are arranged such that movement of the partition 12 away from the minimum energy storage position corresponds to storing energy in the biasing device 18, and movement towards the minimum energy storage position corresponds to releasing energy from the biasing device 18, as outlined in the above.

The spring element(s) may for example be one or more compression springs or tension springs.

Also, the heat transfer fluid system 1000 further comprises a valve assembly 52-57 comprising one or more valves 52, 53, 54, 55, 56, 57, the valve assembly 52-57 being controllable to provide an electric energy supply system heating state of the heat transfer fluid system 1000 wherein release of energy from the biasing device 18 implies a flow of heat transfer fluid from the second volume V2 to the first volume V1 via the heat transfer fluid circuit 200 for heating the electric energy supply system 300.

Figure 3:
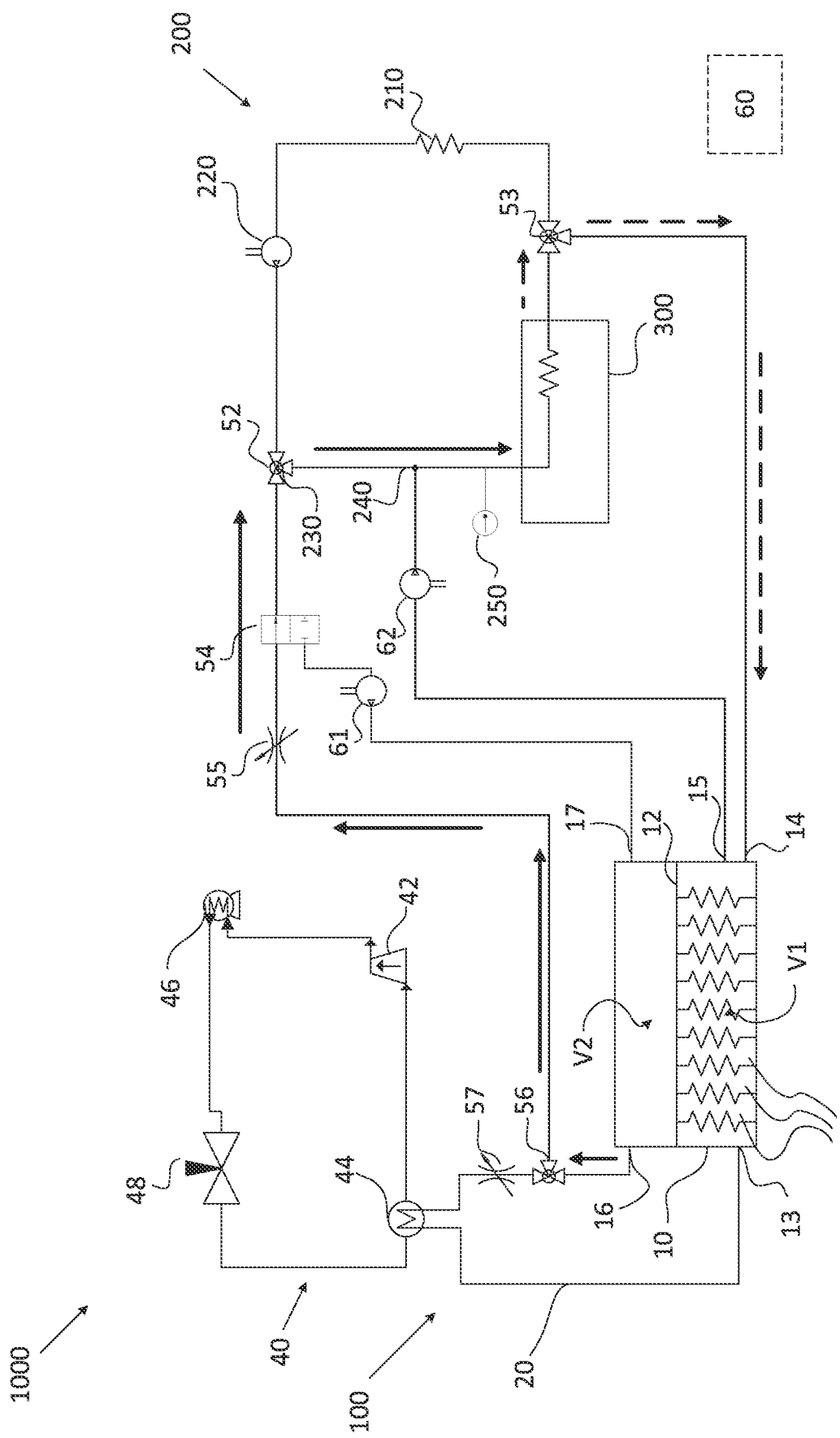
FIG. 3 schematically illustrates the heat transfer fluid system of FIG. 2 when operating in an electric energy supply system heating state.

FIG. 3 illustrates the heat transfer fluid system 1000 when operating in the electric energy supply system heating state. As seen in FIG. 3, the heat transfer fluid system 1000 comprises heat transfer fluid conduits forming a path from the second volume V2 of the tank 10 to the first volume V1 of the tank 10, via the heat transfer fluid circuit 200 configured for heating the electric energy supply system 300. Thus, by operating the valve assembly comprising valves 56, 55, 54, 52, 53 so as to allow a flow of fluid along the path, hot heat transfer fluid (complete arrows) will flow to the heat transfer fluid circuit 200, heating the electric energy supply system 300 and then return as cooler heat transfer fluid (dashed arrows) to the first volume V1 of the tank 10.

As explained in the above, the biasing device 18 of the tank 10 provides a pressure towards the second volume V2. Accordingly, when the valve assembly 52 to 57 is controlled so as to open the above-mentioned path, the biasing device 18 provides the pressure necessary to provide the flow of heat transfer fluid. Accordingly, the mechanical energy stored in the biasing device 18 is used to enable operation of the heat transfer fluid system 1000 in the electric energy supply system heating state.

Accordingly, no additional power such as obtained from a battery or the like is needed to provide the flow for heating the electric energy supply system 300. This renders the electric energy supply heating state suitable for use in a cold start situation, when very little power is generally available. Thus, at least in some variants, the above-mentioned path may be free from flow pressure providing devices such as pumps and/or actuators for providing a flow of heat transfer fluid in the electric energy supply system heating state. Instead, the biasing device 18 provides a pressure to the heat transfer fluid in the second volume V2 sufficient to operate the heat transfer fluid system 1000 in the electric energy supply system heating state.

The valves 52, 53, 54, 55, 56 may be any type of valves suitable for the desired flow control. For example, one or more valves may be restrictor valves 55, three-way valves 56, 52, 53 and/or switchable flow valves 54.

The heat transfer fluid system may further be configured to provide an electric energy supply system cooling state for cooling of said electric energy supply system.

To this end, the heat transfer fluid system 1000 may, as exemplified in FIGS. 2 to 7, further comprise a fluid control assembly 61-63 comprising one or more fluid control devices 61, 62, 63 for controlling the flow and/or pressure of the heat transfer fluid.

The valve assembly 52-57 may be controllable to provide an electric energy supply system cooling state of the heat transfer fluid system 1000 wherein a pressure provided by the fluid control assembly 61-63 implies a flow of heat transfer fluid from the first volume V1 to the second volume V2 via the heat transfer fluid circuit 200 for cooling the electric energy supply system 300 while storing energy in the biasing device 18.

Figure 4:
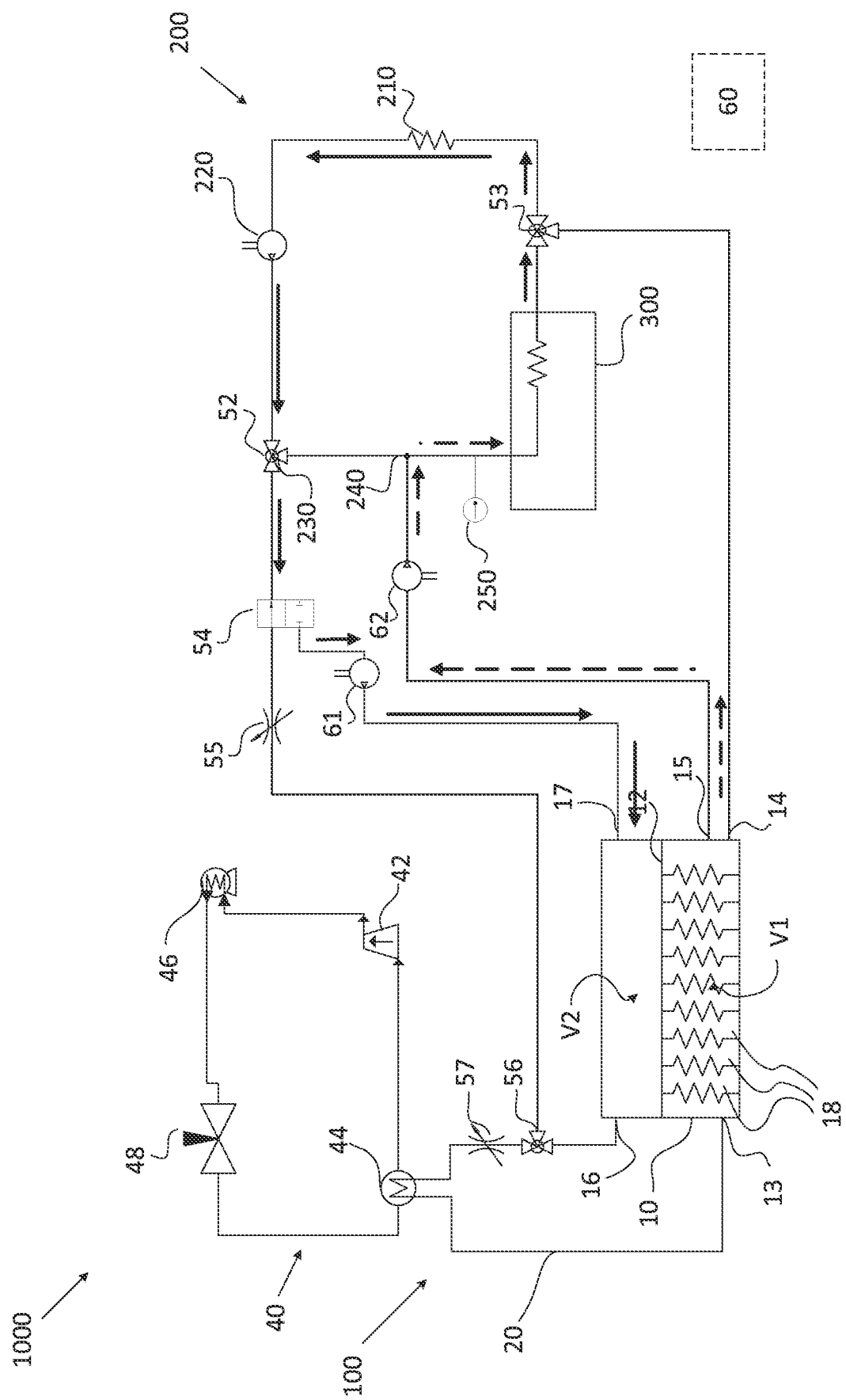
FIG. 4 schematically illustrates the heat transfer fluid system of FIG. 2 when operating in an electric energy supply system cooling state.

FIG. 4 illustrates the heat transfer fluid system 1000 when operating in the electric energy supply system cooling state. As seen in FIG. 4, the heat transfer fluid system 1000 comprises heat transfer fluid conduits forming a path from the first volume V1 of the tank 10 to the second volume V2 of the tank 10, via the heat transfer fluid circuit 200 configured for heating—and for cooling—the electric energy supply system 300. Thus, by operating the valve assembly comprising valves 52, 53, 54 so as to allow a flow of fluid along the path, and also operating the fluid control assembly 61-63 so as to imply a pressure to provide a heat transfer fluid flow, cool heat transfer fluid (dashed arrows) will flow to the heat transfer fluid circuit 200, cooling the electric energy supply system 300 and then return as hotter heat transfer fluid (complete arrows) to the second volume V2 of the tank 10.

Thus, the heat transfer fluid system 1000 may be configured so as to operate optionally in the electric energy supply system heating state (FIG. 3) and in the electric energy supply system cooling state (FIG. 4). As mentioned in the above, the electric energy supply system heating state may be useful in certain conditions such as at a cold start. The electric energy supply system cooling state may be useful in other conditions, such as during long-term operation of the electric energy supply system 30, or in tough driving conditions such as driving uphill during a hot day, when the electric energy supply system 30 may risk becoming overheated.

The fluid control assembly 61-63 is configured for providing a pressure implying a flow of heat transfer fluid from the first volume V1 to the second volume V2 via the heat transfer fluid circuit 200.

The pressure provided by the fluid control assembly 61-63 will work against the bias of the biasing device 18 so as to move the partition 12 towards the maximum energy storage position while storing energy in the biasing device 18. Accordingly, the fluid control assembly 61-63 provides for the storage of energy in mechanical form in the biasing device 18.

Also, the fluid control assembly 61-63 together with the heating of the heat transfer fluid obtained in heat transfer fluid circuit 200, provide for the storage of energy in thermal form by the heating of the heat transfer fluid stored in the second volume V2.

In the variant illustrated in the figures, a first fluid control device 61 is located downstream the heat transfer fluid circuit 200, upstream the second volume V2. A second fluid control device 62 is located upstream the first volume V1, downstream the heat transfer fluid circuit. (Directions as seen when the heat transfer fluid system is in the electric energy supply system cooling state.

Also, a third fluid control device 220 is arranged in the heat transfer fluid circuit 200.

For example, and as in the variant of FIGS. 2 to 7, one or more of the fluid control devices 61, 62, 63 of the fluid control assembly 61-63 comprises a pump 61, 62. The pump may be adapted to provide a pressure of the heat transfer fluid being sufficient to accomplish the movement of the partition 12 towards the maximum energy storage position while storing energy in the biasing device 18. As such, the pumps may be adapted to provide a relatively high pressure.

In another example, the fluid control assembly may comprise a fluid control device in the form of an actuator mechanically acting on the partition 12 so as to move the partition toward the maximum energy storage position while storing energy in the biasing device 18. The movement of the partition 12 will provide a pressure implying a flow of heat transfer fluid from the first volume V1 to the second volume V2 by virtue of the increase in size of the second volume V2. Optionally, an actuator may be arranged to operate in combination with another fluid control device such as a pump, whereby the pressure provided by the pump and the action of the actuator cooperates to provide a pressure implying a flow of heat transfer fluid from the first volume V1 to the second volume V2.

Figure 6:
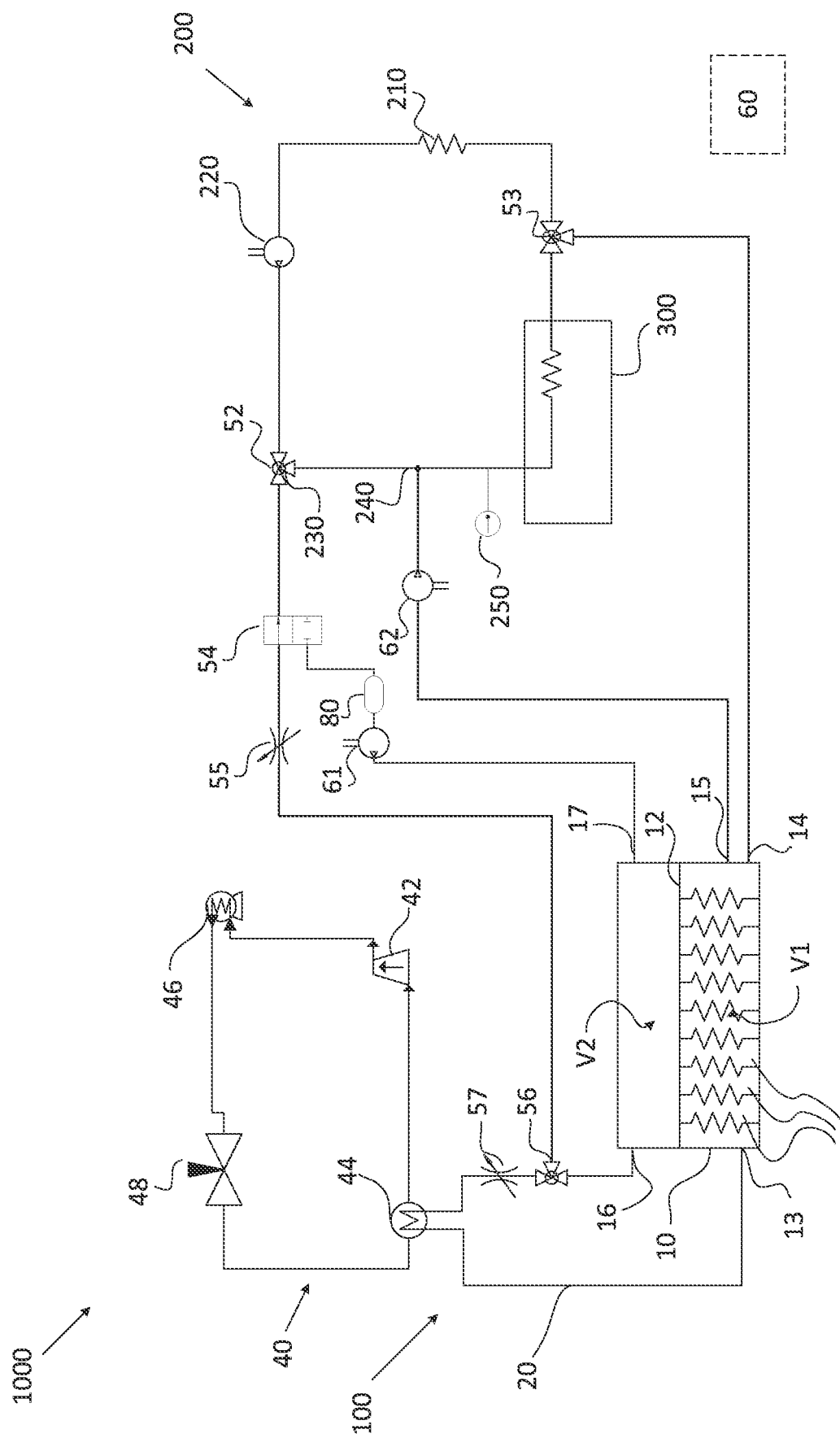
FIG. 6 schematically illustrates a second variant of a heat transfer fluid system according to the first aspect.
Figure 7:
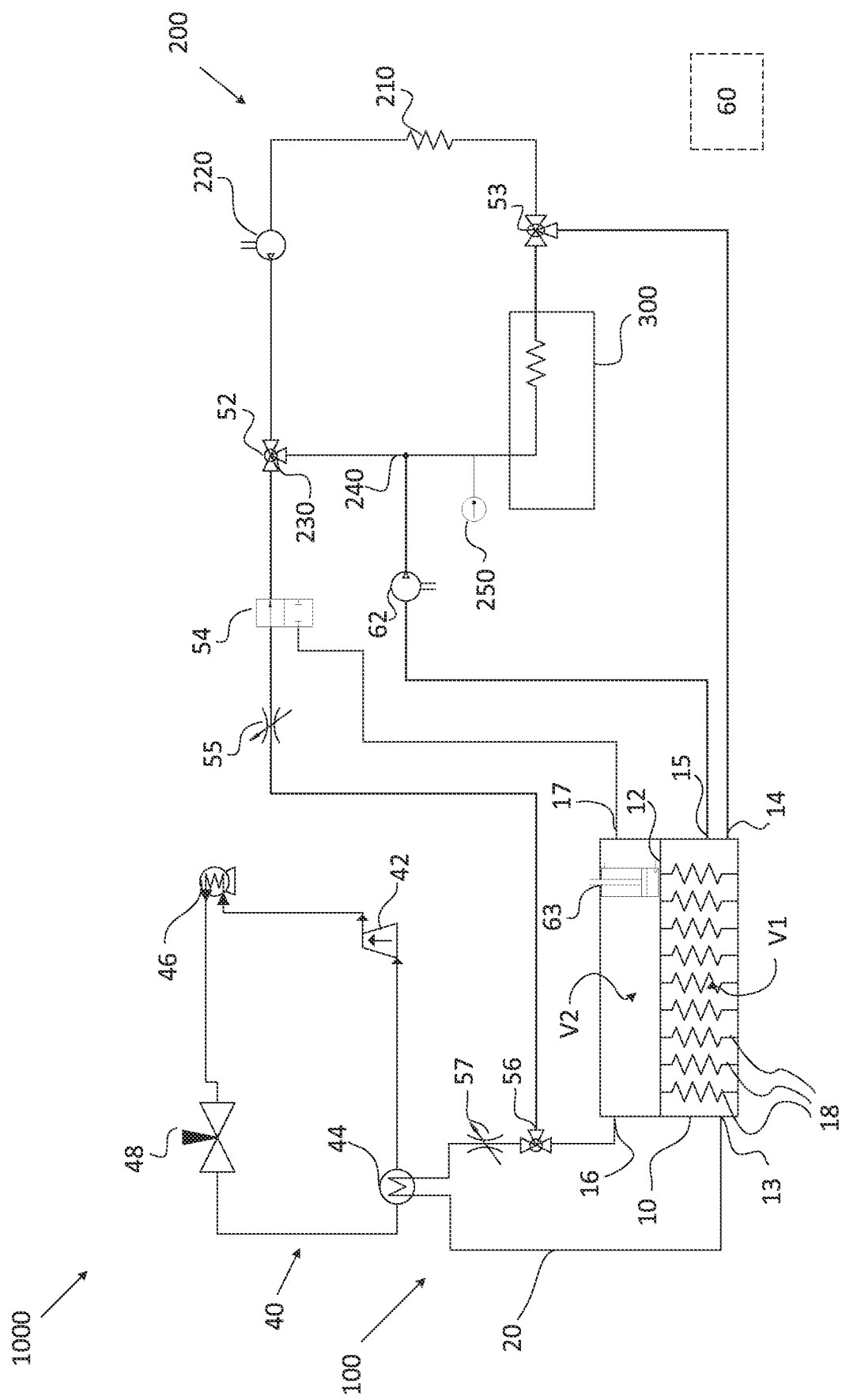
FIG. 7 schematically illustrates a third variant of a heat transfer fluid system according to the first aspect.

FIG. 7 illustrates a variant comprising such an actuator 63. In FIG. 7, the pump 61 downstream the heat transfer fluid circuit 200 (as seen in the cooling state) is removed if compared to the embodiment of FIGS. 2 to 6. However, it will be understood that numerous variants are possible. Thus, the fluid flow in the cooling state is provided by action of the 62, the pump 220 and the actuator 63.

Optionally, the heat transfer fluid system 1000 may comprise a heat transfer fluid reservoir 80 arranged along a flow path of the heat transfer fluid when the heat transfer fluid system 1000 is in the electric energy supply system cooling state.

FIG. 6 illustrates a variant wherein such a heat transfer fluid reservoir 80 is arranged downstream of the heat transfer fluid system 200, as seen when the heat transfer fluid system is in the electric energy supply system cooling state. Also, in this variant, the heat transfer fluid reservoir 80 is arranged upstream the fluid flow control device 61.

By providing one or more fluid reservoirs 80, the operation of the heat transfer system 1000 may be rendered more versatile by expanding the volume in the heat transfer fluid system.

For example, the fluid reservoir 80 may provide an interim storage of heat transfer fluid, allowing the fluid flow control device 61 to be operated selectively. For example, the fluid flow control device 61 may be arranged to be operated only when there is excess power available from another arrangement in the vehicle 1, such as when energy is dissipated from the braking system 400 of the vehicle during a braking event.

As illustrated by FIGS. 3 and 4, the heat transfer fluid circuit 200 may be configured to allow a flow of heat transfer fluid in two different directions: a first direction (FIG. 3) configured for heating of the electric energy supply system 300, and a second, opposite direction (FIG. 4) configured for cooling the electric energy supply system 300. As such, the same heat transfer fluid circuit 200 may be used for heating or for cooling of the electric energy supply system 300.

Optionally, and as exemplified in FIGS. 2 to 7, the heat transfer fluid system 1000 further comprises a fluid cooling circuit 100 comprising a cooling assembly 40. In this case, the valve assembly 52-57 is controllable to provide a fluid cooling state of the heat transfer fluid system 1000, wherein release of energy from the biasing device 18 implies a flow of heat transfer fluid from the second volume V2 to the first volume V1 via the fluid cooling circuit 100 for cooling the heat transfer fluid. The cooling circuit 100 is arranged such that the flow of heat transfer fluid from the second volume V2 to the first volume V1 via the fluid cooling circuit 100 in the fluid cooling state is not via the electric energy supply system 300.

Thus, the provision of a fluid cooling circuit 100 provides an alternative way of cooling the heat transfer fluid when it is not desired to heat the electric energy supply system 300. This enables using the electric energy supply system cooling state more frequently, since when the system is operated in the fluid cooling state, relatively cool heat transfer fluid is brought to the first volume V1 where it will be available for further use in the electric energy supply cooling state.

Figure 5:
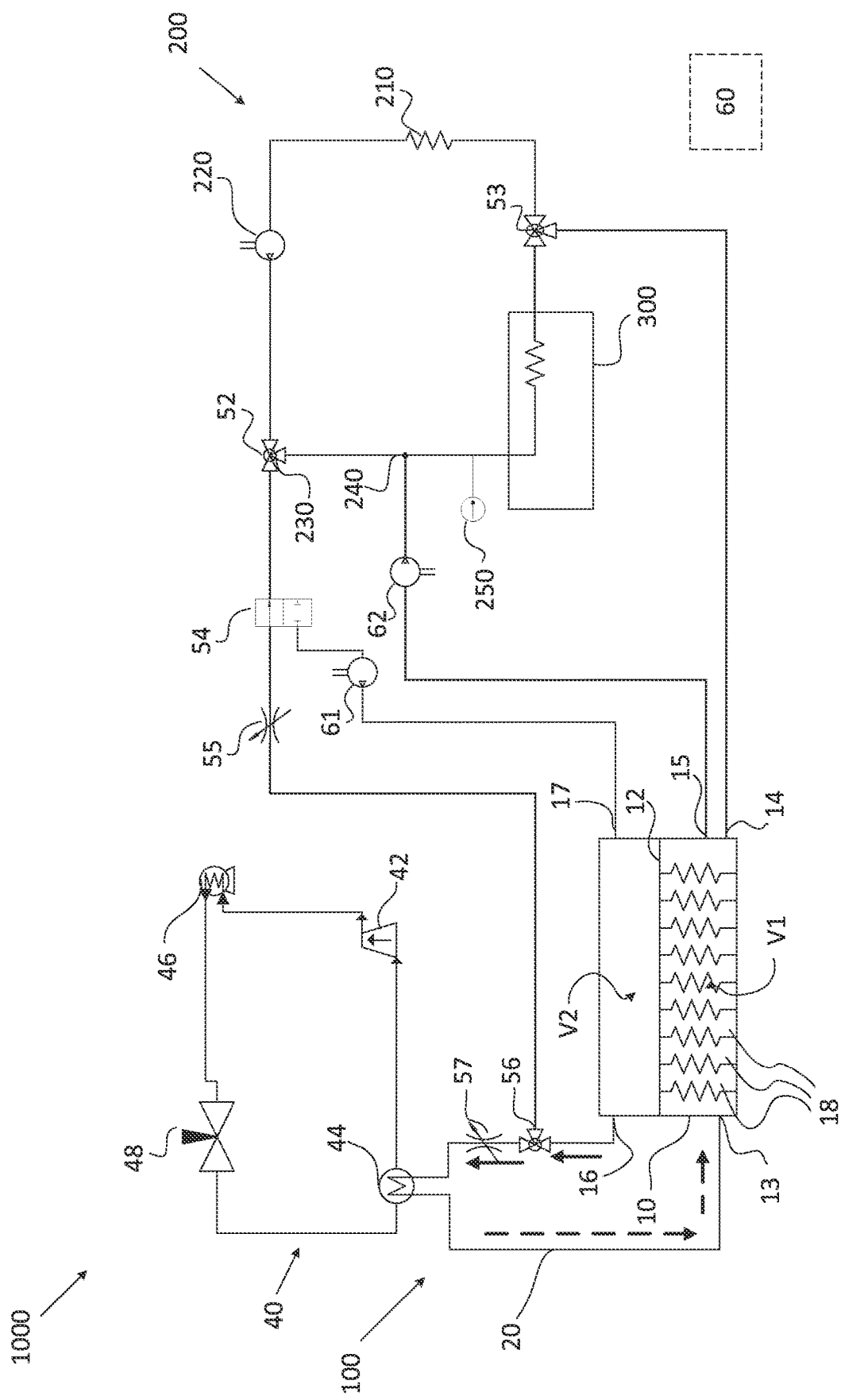
FIG. 5 schematically illustrates the heat transfer fluid system of FIG. 2 when operating in a fluid cooling state.

FIG. 5 illustrates the heat transfer fluid system 1000 of FIG. 2 when operating in the fluid cooling state. As seen in FIG. 5, the heat transfer fluid system 1000 comprises heat transfer fluid conduits forming a path from the second volume V2 of the tank 10 to the first volume V1 of the tank 10, via the cooling assembly 40 configured for cooling the heat transfer fluid. Thus, by operating the valve assembly comprising the valves 56 and 57 so as to allow a flow of fluid along the path, and by the action of the biasing means 18 urging the partition 12 towards the minimum energy storage position, relatively hot heat transfer fluid (complete arrows)

will flow via the cooling assembly 40 and then return as relatively cool heat transfer fluid (dashed arrows) to the first volume V1 of the tank 10.

The cooling assembly 40 may, as in the variant of the Figures, comprise a cooling circuit with one or more cooling circuit elements. For example, and as illustrated in the Figures, the cooling circuit may comprise an evaporator 44 and/or a compressor 42, and/or a condenser 46 and/or an expansion valve 48.

In a further, non-illustrated variant, the heat transfer fluid system 1000 may comprises at least one auxiliary heat generating device, and the valve assembly 52-57 may be controllable to provide a fluid heating state of the heat transfer fluid system 1000, wherein a pressure provided by the fluid control assembly 61-63 implies a flow of heat transfer fluid from the first volume V1 to the second volume V2 via the auxiliary heat generating device for heating the heat transfer fluid while storing energy in the biasing device 18.

Such a fluid heating state could be useful if it is required to ensure that the volume of relatively hot heat transfer fluid in the second volume V2 is sufficient for heating the electric energy supply system at a cold start before stopping the vehicle. The fluid flow when in such a fluid heating state thus need not pass the electric energy supply system 300.

However, it is believed that for most applications, a separate fluid heating state will not be necessary.

For controlling the heat transfer fluid system 1000 to obtain the various states as described in the above, input may be needed. For example, the heat transfer fluid system 1000 may comprise a temperature sensor 250 providing a signal indicative of a temperature of the heat transfer fluid entering the electric energy supply system 300. Such a temperature sensor 250 may for example be used to issue a request for cooling or heating of the electric energy supply system 300.

Further, the heat transfer fluid system may comprise additional sensors such as temperature and/or flow sensors.

Optionally, the heat transfer fluid system 1000 may comprise a control unit 60 adapted to control the valve assembly 52-57 and/or the fluid control assembly 61-63 and/or the cooling assembly 40. As such, the control assembly 60 may be adapted to control the heat transfer fluid system to obtain the various states as described in the above.

The control unit 60 may communicate with the heat transfer fluid system 1000 via wired or wireless connections. When the heat transfer fluid system 1000 is arranged on a vehicle 1, the control unit 60 may be provided on board the vehicle 1 or remote from the vehicle 1.

In view of the above description of a heat transfer fluid system, numerous methods for controlling a heat transfer system according to the first aspect are available.

Thus, there is provided a method for controlling a heat transfer fluid system 1000 comprising, after determining a need for heating the electric energy supply system 300,
 using the heat transfer fluid system 1000 in the electric energy supply system heating state for heating the electric energy supply system 300.

For example, the need for heating the electric energy supply system 300 may be implied by a cold start situation of the vehicle 1.

Further, there is provided a method for controlling a heat transfer fluid system 1000 comprising: after determining a need for cooling the electric energy supply system 300,
 using the heat transfer fluid system 1000 in the electric energy supply system cooling state for cooling the electric energy supply system 300.

Further, there is provided a method for controlling a heat transfer fluid system 1000 comprising, after determining a need for cooling the heat transfer fluid and/or
 after determining a need for dissipating energy,
 using the heat transfer fluid system 1000 in the fluid cooling state.

The methods may be implemented by a controller 60 arranged to control the valve assembly 52-57 and, when present, the fluid control assembly 61-63.

Figure 8:
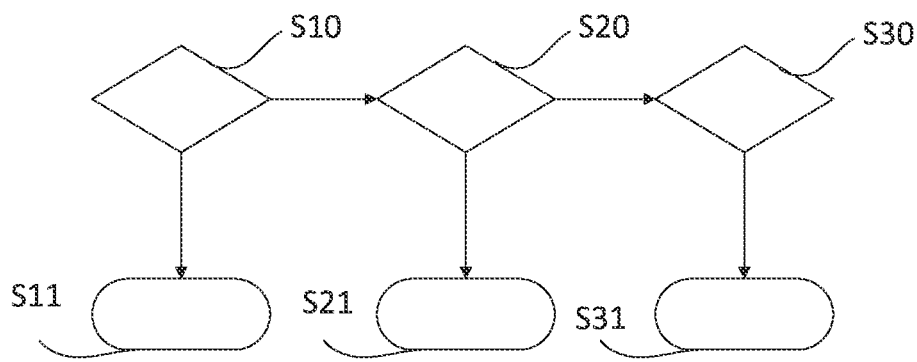
FIG. 8 is a diagram schematically illustrating method steps of a variant of a method for controlling a heat transfer fluid system according to the first aspect.

FIG. 8 schematically illustrates a method scheme for implementing all of the methods proposed in the above, i.e. in a controller 60 arranged to control the a valve assembly 52-57 and the fluid control assembly 61-63.

Hence, the method exemplified in FIG. 8 involves a first determination step S10 of determining a need for heating the electric energy supply system 300. For example, the step S10 may involve receiving a request for heating the electric energy supply system 300. If the answer is yes, the method goes on to a step S11 of using the heat transfer fluid system 1000 in the state for heating the electric energy supply system 300. This step S11 hence involves controlling the valve assembly 52-57 so as to achieve the heat transfer state.

If the answer in the first determination step S10 is no, the method goes on to a second determination step S20, which comprises determining a need for cooling the electric energy supply system 300. For example, the step S20 may involve receiving a request for cooling the electric energy supply system 300. If the answer is yes, the method goes on to a step S21 of using the heat transfer fluid system 1000 in the state for cooling the electric energy supply system 300. This step S21 may hence involve controlling the valve assembly 52-27 and the fluid control assembly 61 to 63 so as to achieve the state.

If the answer in the second determination step S20 is no, the method goes on to a third determination step S30, which comprises determining a need for cooling the heat transfer fluid and/or a need for recuperating energy. If the answer is yes, the method goes on to a step S31 of using the heat transfer fluid system 1000 in the state for cooling the heat transfer fluid. This step S21 may hence involve controlling the valve assembly 52-27 and the fluid control assembly 61 to 63 so as to achieve the state.

Many options and variants are available to a person skilled in the art. For example, steps of the methods as described in the above may be performed in various order and/or even simultaneously.

For example, it is envisaged that the power consuming devices described in the above, such as for example pumps, actuators and/or compressors may be driven by recuperated energy from an energy dissipating arrangement in a vehicle. For example, the energy dissipating arrangement may be a braking arrangement 400.

The flow paths as described in the above may be obtained using many different configurations of heat transfer conduits and/or valves. For example, bi-directional valves such as the valve 54 illustrated in FIGS. 2 to 7 may be utilised to provide useful options.

Also, the arrangement of the inlets/outlets for the transfer fluid may be varied. For example, in FIGS. 2 to 7 the storage tank 10 is provided with a first volume inlet 14 and a second volume outlet 16 connected to the flow path in the electric energy supply system heating state. In addition, the storage tank 10 is provided with a second volume inlet 17 and a first volume outlet for providing the flow path in the electric energy supply system cooling state. Finally, the storage tank 10 is provided with a second volume outlet 16 and a first volume inlet 13 for providing the flow path for the transfer fluid cooling state. Other variants may however be available, for example using one inlet/outlet to achieve more than one of the desired flow paths.

Also, the cooling system 200 may comprise other devices for cooling/heating than the electric energy supply system 300. For efficient heating of the electric energy supply system 300 when in a cold start situation, such devices may be arranged downstream of the electric energy supply system 300, as seen in the flow direction of the electric energy supply system heating state. For example, and as illustrated in the Figures, the cooling system 200 may comprise a heat exchanger 210. In an example, when the heat transfer fluid system is in the electric energy supply system cooling state, the heat transfer fluid first passes the electric energy supply system 300 for cooling thereof, resulting in the heat transfer fluid taking up heat. The subsequent passage past the heat exchanger 210 may then be used for removing heat from the heat transfer fluid, i.e. for cooling the heat transfer fluid.

The invention claimed is:

1. A heat transfer fluid system for a vehicle comprising an electric energy supply system, the heat transfer fluid system comprising:
   a heat transfer fluid circuit arranged for controlling a temperature of the electric energy supply system by means of a heat transfer fluid, and
   a heat transfer fluid storage tank defining a tank volume for the heat transfer fluid, the heat transfer fluid storage tank comprising:
      a partition dividing the tank volume into a first volume and a second volume, and
      a biasing device,
      wherein the partition is movable to/from any position between a minimum heat storage position corresponding to a minimum second volume, and a maximum heat storage position corresponding to a maximum second volume,
      wherein movement of the partition away from the minimum heat storage position corresponds to storing energy in the biasing device, and movement towards the minimum heat storage position corresponds to releasing energy from the biasing device; and
   the heat transfer fluid system further comprises:
      a valve assembly comprising one or more valves, the valve assembly being controllable to provide an electric energy supply system heating state of the heat transfer fluid system wherein release of energy from the biasing device produces a flow of heat transfer fluid from the second volume to the first volume via the heat transfer fluid circuit for heating the electric energy supply system.

2. The heat transfer fluid system of claim 1, wherein the heat transfer fluid system further comprises a fluid control assembly comprising one or more fluid control devices for controlling the flow and/or a pressure of the heat transfer fluid.

3. The heat transfer fluid system of claim 2, wherein the valve assembly is controllable to provide an electric energy supply system cooling state of the heat transfer fluid system, and wherein a pressure provided by the fluid control assembly produces a flow of heat transfer fluid from the first volume to the second volume via the heat transfer fluid circuit for cooling the electric energy supply system while storing energy in the biasing device.

4. The heat transfer fluid system of claim 3, wherein the one or more fluid control devices of the fluid control assembly comprises a pump.

5. The heat transfer fluid system of claim 4, wherein the pump is arranged downstream of the heat transfer fluid circuit, when the heat transfer fluid system is in the electric energy supply system cooling state.

6. The heat transfer fluid system of claim 3, wherein the one or more fluid control devices of the fluid control assembly comprises an actuator arranged to urge the partition in a direction towards the maximum heat storage position while storing energy in the biasing device.

7. The heat transfer fluid system of claim 1, further comprising a fluid control assembly and a heat transfer fluid reservoir arranged along a flow path of the heat transfer fluid when the heat transfer fluid system is in the electric energy supply system cooling state.

8. The heat transfer fluid system of claim 7, wherein the heat transfer fluid reservoir is arranged downstream of the heat transfer fluid circuit when the heat transfer fluid system is in the electric energy supply system cooling stage.

9. The heat transfer fluid system of claim 1, further comprising:
   a fluid cooling circuit comprising a cooling assembly,
   wherein the valve assembly is controllable to provide a fluid cooling state of the heat transfer fluid system, wherein release of energy from the biasing device produces a flow of heat transfer fluid from the second volume to the first volume via the fluid cooling circuit for cooling the heat transfer fluid.

10. The heat transfer fluid system of claim 9, wherein the cooling assembly comprises one or more of: an evaporator, a compressor, a condenser, and an expansion valve.

11. The heat transfer fluid system of claim 9 wherein the cooling assembly is configured to be driven by recuperated energy from an energy dissipating arrangement.

12. The heat transfer fluid system of claim 1, further comprising a control unit configured to control one or more of: the valve assembly, the fluid control assembly, and the cooling assembly.

13. A vehicle comprising the heat transfer fluid system of claim 1.

14. A method for controlling the heat transfer fluid system of the vehicle of claim 13, the method comprising:
   after determining a need for heating the electric energy supply system, using the heat transfer fluid system in the electric energy supply system heating state for heating the electric energy supply system.

15. The method of claim 14, wherein the need for heating the electric energy supply system is prompted by a cold start situation of the vehicle.

16. A method for controlling the heat transfer fluid system of claim 3, the method comprising:
   after determining a need for cooling the electric energy supply system, using the heat transfer fluid system in the electric energy supply system cooling state for cooling the electric energy supply system.

17. A method for controlling the heat transfer fluid system of claim 9, the method comprising:
   after determining a need for cooling the heat transfer fluid and/or after determining a need for dissipating energy, using the heat transfer fluid system in the fluid cooling state.

* * * * *